INVENTORS.
EDGAR R. BOYLES.
CLARENCE M. PATTISON.
BY
ATTORNEYS.

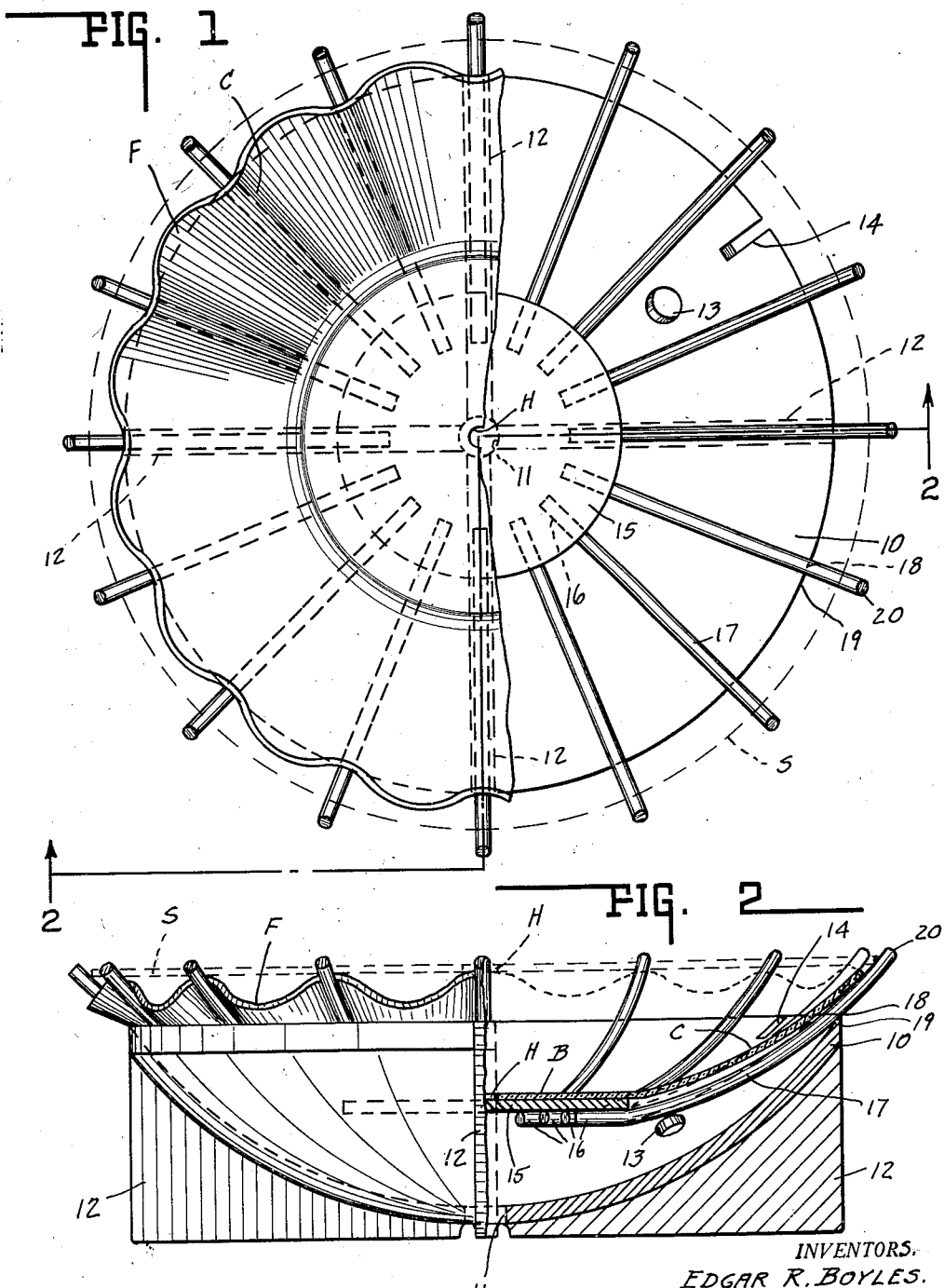

April 11, 1950  E. R. BOYLES ET AL  2,503,653
APPARATUS FOR DISHING AND VARIEGATING
SUBSTANTIALLY FLAT GLASS SHEETS Filed Sept. 24, 1945  3 Sheets-Sheet 3

INVENTORS.
EDGAR R. BOYLES.
CLARENCE M. PATTISON.
BY
Lockwood, Goldsmith & Galt,
ATTORNEYS.

Patented Apr. 11, 1950

2,503,653

UNITED STATES PATENT OFFICE 2,503,653

APPARATUS FOR DISHING AND VARIEGATING SUBSTANTIALLY FLAT GLASS SHEETS

Edgar R. Boyles and Clarence Marion Pattison, Hartford City, Ind.; said Pattison assignor to said Boyles as trustee Application September 24, 1945, Serial No. 618,134

5 Claims. (Cl. 49—67)

This invention relates to apparatus for shaping glass or like material to include therein scallops, flutes, annular corrugations and which, if desired, may be highly ornamented on the surface.

The chief object of the present invention is to shape glass or like sheets for lamp shade purposes and the like and which are highly ornamented, if desired.

The chief feature of the present invention resides in subjecting a glass sheet, surface ornamented or otherwise, to a softening heat that is just sufficient to permit gravity conformation to a skeleton mold of the sheet, usually but not necessarily flat, and of the desired peripheral outline, to produce in that sheet the desired conformation.

After conformation, the glass article is gradually cooled (annealed as it were) for removal of strain so that slight shock does not result in shattering for glass primarily is held together by surface tension in the outer surfaces.

For purposes of illustration, lamp shade formation is disclosed herein. Furthermore, since a complete disclosure of suitable apparatus will also disclose simultaneously the process, reference primarily will be had to the former. Also by way of example only, conformance of the concave type is herein disclosed, but it is to be understood convex type conformance is contemplated within the scope of this disclosure by suitably reversal.

Other objects and features of the invention will be set forth more fully hereinafter.

The full nature of the invention will be understood from the accompanying drawings and the following description and claims.

In the drawings—

Fig. 1 is a top plan view of a skeleton mold of concave type with pattern addition of similar type and the conformed article therein, a portion of the latter being broken away to show the former in plan, certain dotted lines indicating the initial periphery of the substantially flat sheet prior to conformance.

Fig. 2 is a vertical sectional view taken on broken line 2—2 of Fig. 1 and in the direction of the arrows.

Figure 3:
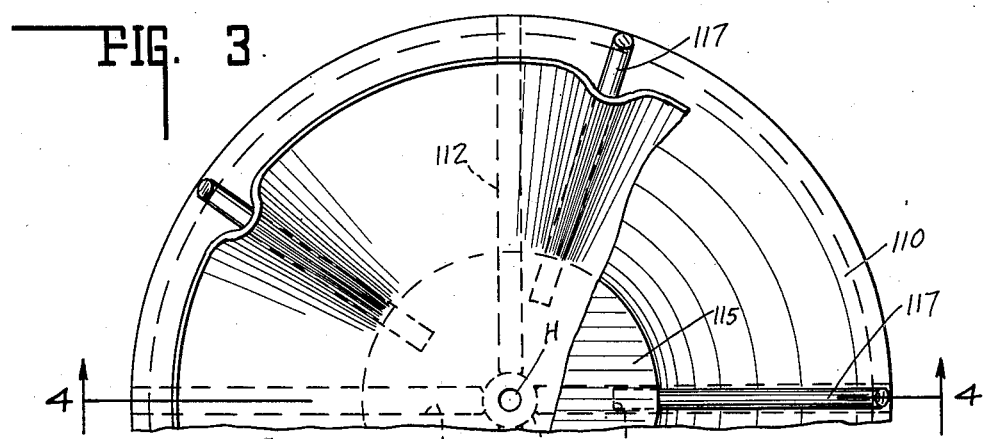
Fig. 3 is a view similar to Fig. 1 and a modified form of apparatus and article and of a portion of same.

In Figs. 1 and 2 of the drawings 10 indicates a bowl-like shell portion having central aperture 11 therein and provided with a plurality of supporting vanes 12. Within said bowl is an offset aperture 13 and a radial notch 14 to facilitate article removal following conformation.

Centrally positioned relative to the bowl is a base plate 15 to the underface of which are rigidly secured the inner ends 16 of the outwardly and radially directed ribs 17 and same have a curvature less than that of bowl 10 so that they bear as at 18 upon the upper periphery 19 of the bowl. The ends 20 project beyond the bowl.

A flat sheet of glass S is nested upon and preferably within the ribs and has an outer periphery greater than the bowl periphery. The associated parts are then subjected to a gradually increasing heat, as by passing same into a tunnel lehr or the like, the rate of temperature rise in glass determining the heat supply variation.

As the temperature approaches the bending temperature, the glass sheet sags at the unsupported center due to its unsupported mass. This temperature is maintained until the glass sheet S, having hole H, rests upon plate 15 as at B and conforms to the shape of the ribs 17 as at C.

Since the spacing between ribs 17, near the periphery of plate 15, is quite small, at this point little or no sag of portion C occurs. However, where the spacing between ribs 17 is sufficient, as at 19 or beyond and slightly inside of the bowl periphery, glass sag between the ribs occurs. This results in a scallop or flute effect F.

Following such conformance of the sheet, the same and the skeleton form is subjected to a decreasing temperature, the rate of temperature fall and duration of cooling, to produce in effect annealed ware, being determined by the character of the glass, etc. as well understood in the art of cooling (annealing) glassware.

When the mold and article emerges from the annealing oven, if such be used, instruments are applied to notch 14 and hole 13 and the article elevated from the mold. Then a new sheet is applied as before and process described is repeated.

Figure 4:
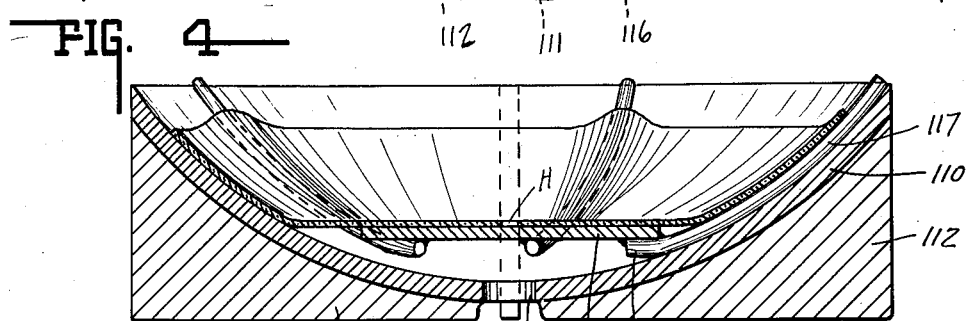
Fig. 4 is a vertical sectional view taken on line 4—4 of Fig. 3 and in the direction of the arrows.

Reference will now be had to Figs. 3 and 4, wherein 110 indicates a shallow bowl or shell having supporting exterior vanes 112 and centrally apertured at 111. The umbrella frame comprises flat base plate 115 to which on the underface is suitably secured, as by welding or the like, the inner ends 116 of the radially directed curved ribs 117 which terminate within the bowl and have the same curvature thereof as illustrated.

As before the glass sheet rests upon the ribs, and when properly heated sags to conform the shell interior. The upper face of the plate end is fluted where it sags about the ribs.

Figure 5:
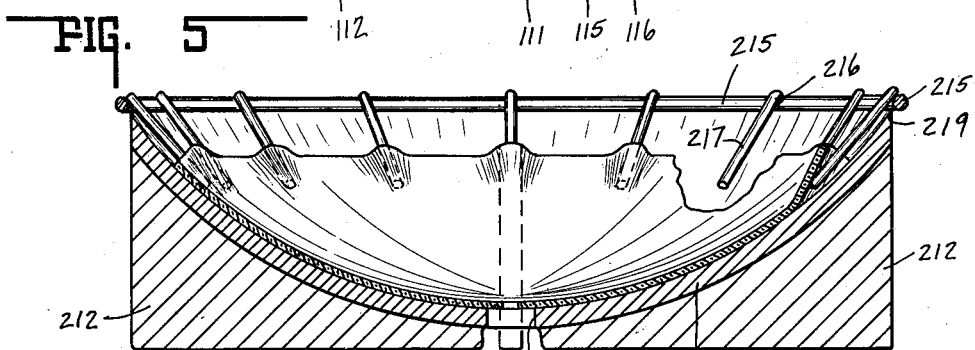
Fig. 5 is a central vertical sectional view of a third embodiment of the invention, a portion of the article being broken away to show a portion of the apparatus in greater detail.
Figure 6:
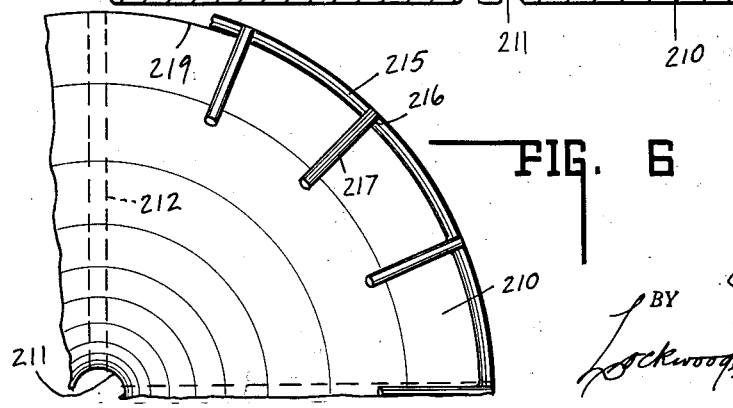
Fig. 6 is a quarter plan view of the apparatus shown in Fig. 5.

Reference will now be had to Figs. 5 and 6 wherein 210 indicates the shell or bowl centrally apertured at 211 and having external supporting vanes 212. The upper edge of the bowl is indicated at 219.

Herein the base is of external type comprising a ring 215 from which projects the ribs 217 secured thereto as by welding or the like at 216. This rib structure is set in the bowl and then the glass sheet is applied. When sufficiently heated, the unsupported central mass sags and in so doing the scallops in the glass edge are formed. Complete conformance of the glass to the bowl occurs except at the edge as illustrated.

Figure 7:
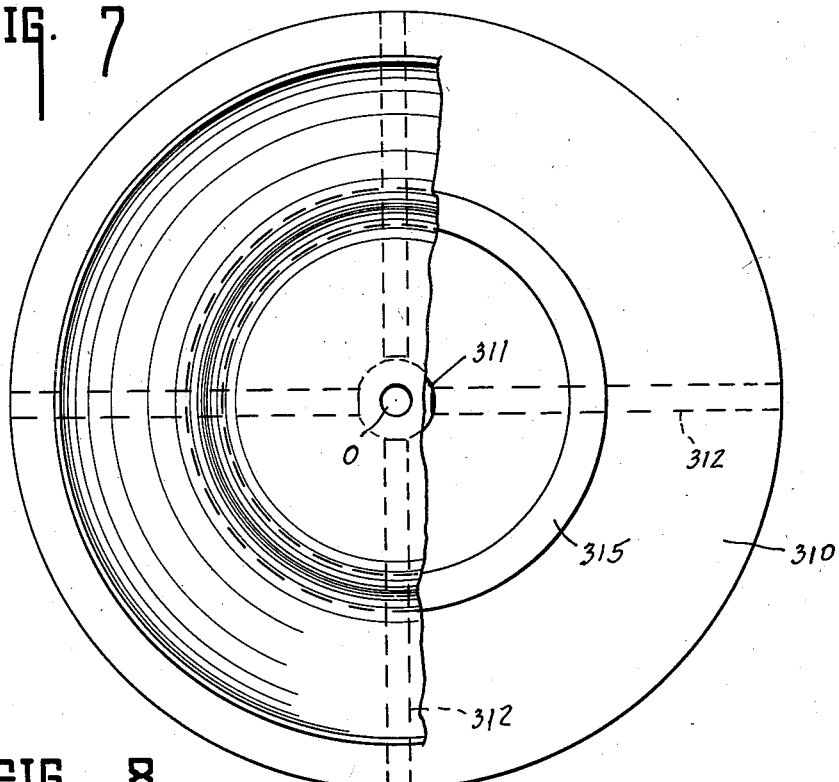
Fig. 7 is a top plan view, similar to Figs. 1 and 3, with a portion of the article broken away, and of another embodiment of the invention.
Figure 8:
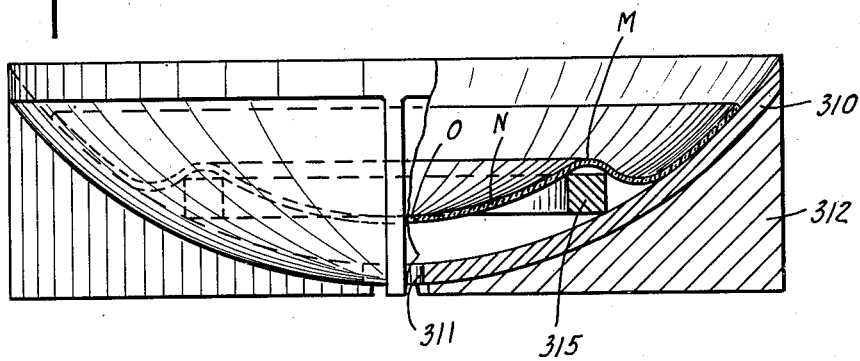
Fig. 8 is a view, similar to Fig. 2, and of the form of the invention illustrated in Fig. 7.

Reference will now be had to Figs. 7 and 8 wherein 310 indicates the shell centrally apertured as at 311 and supported by external vanes 312. An annular ring 315 rests upon the shell interior.

The glass sheet upon sagging thus conforms to the shell interior near the outer portion, includes a coaxial corrugation M and a slightly curved central portion N apertured at O for lamp shade or like purposes.

Figure 9:
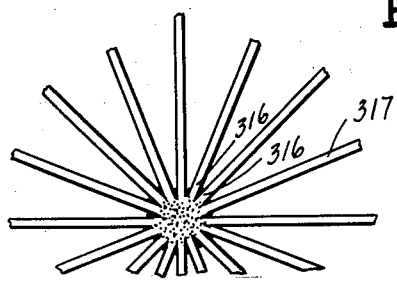
Fig. 9 is a plan view of an umbrella frame type form of the invention whereby substantially full length flutes are produced.

Reference will now be had to Fig. 9. Herein the central plate, such as 15 in Figs. 1 and 2, and 115 in Figs. 3 and 4, is omitted and all ribs 317 have their inner ends 316 welded together. The resultant umbrella frame, when used with any shell, produces what might be termed full length flutes, although obviously the central portion of the dished glassware will not be fluted because of lack of space between the ribs near the inner ends thereof.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. Apparatus for dishing and variegating substantially flat glass sheets comprising a main support mold of metal for head reflection purposes, and a supplementary mold having a plurality of spokes and directly supported by the main mold, the flat sheet, when supported by both molds and subjected to a glass sagging temperature, conforming by gravity thereto.

2. Apparatus as defined by claim 1 wherein means is provided and connected to one end of each spoke for supplementary mold unitation.

3. Apparatus as defined by claim 2 wherein the spoke connecting means comprises a peripheral member at the outer ends of the spokes.

4. Apparatus as defined by claim 2 wherein the spoke connecting means comprises a central member at the inner ends of the spokes.

5. Apparatus as defined by claim 2 wherein the spoke connecting means comprises welding material at the adjacent inner ends of the spokes, said ends terminating immediately contiguous to each other.

EDGAR R. BOYLES.
CLARENCE MARION PATTISON.

REFERENCES CITED

The following references are of record in the file of this patent:

UNITED STATES PATENTS

| Number | Name | Date |
|---|---|---|
| 327,406 | Northwood | Sept. 29, 1885 |
| 336,666 | Ripley | Feb. 23, 1886 |
| 632,008 | Dorpols | Aug. 29, 1899 |
| 934,094 | Peterson | Sept. 14, 1909 |
| 1,593,614 | Zeiler | July 27, 1926 |
| 2,122,083 | Boudin et al. | June 28, 1938 |
| 2,194,538 | Allen | Mar. 26, 1940 |

FOREIGN PATENTS

| Number | Country | Date |
|---|---|---|
| 128,447 | Great Britain | June 26, 1919 |